Inventors
Vernon B. Honsinger
Clarence B. Hilgeman
Paul D. Wagner
By John C. Stiner
Attorney United States Patent Office 3,509,621
Patented May 5, 1970

3,509,621
METHOD OF APPLYING A SUPPORT FOR THE END TURNS OF A DYNAMOELECTRIC MACHINE
Vernon B. Honsinger, Clarence B. Hilgeman, and Paul D. Wagner, Cincinnati, Ohio, assignors to Allis-Chalmers Manufacturing Company, Milwaukee, Wis.
Filed May 29, 1968, Ser. No. 733,031
Int. Cl. H02k 15/00
U.S. Cl. 29—596         2 Claims

ABSTRACT OF THE DISCLOSURE

A method for supporting the coil end turns of a dynamoelectric machine which includes an open-ended insulated ring loosely applied about the end turns. A tightening strap is then positioned about the open-ended ring and tightened until the end turns are sufficiently compressed. A heat curable tape is then tightly wound around the exposed portion of the open-ended ring and after this is done the tightening strap is removed and another layer of heat curable tape is wound around the portion formerly occupied by the tightening strap.

---

This invention relates in general to dynamoelectric machines and more particularly to a method of banding the rotor end turns of such a machine.

In the manufacture of wound rotors for dynamoelectric machines, it is necessary to provide some form of support for the end turns to resist the action of centrifugal force on the end turns. One common previously used method employed coil supports both above and below the end turns. A wheellike device made of cast steel or iron was inserted under the end turns. The wheel was commonly provided with a hub to fit onto the rotor shaft and also with a machined smooth surface on the rim of the wheel. Intricate lacing was required to tie the individual coils to the rim of the wheel. Additionally, banding was provided around the coils and the rim.

The provision of the wheellike tie down device to the rotor added to the expense of the motor. This arrangement required a costly machining operation of the surface of the rim of the wheel and also required means for attaching the wheel to the rotor shaft. Furthermore, considerable hand operations were required to tie the coils to the wheel rim. It also proved extremely difficult to sufficiently specify exactly how the coils should be tied to the rim to insure uniformity in the finished product.

It is, therefore, the general object of the present invention to provide an improved method for banding the end turns of a dynamoelectric machine.

Another object of the present invention is to provide a method for banding the end turns of a dynamoelectric machine which utilizes a high tensile strength open-ended insulated ring which is compressed about the end turns forming them into a compact mass and which resists the action of centrifugal force on the end turns.

A more specific object of the subject invention is to provide a method of banding the end turns of a dynamoelectric machine of the hereintofore described type wherein heat curable tape is tightly wound about the open-ended ring after it has been compressed about the end turns.

These and other objects of the subject invention will become more fully apparent as the following description is read in light of the attached drawing wherein.

Figure 1:
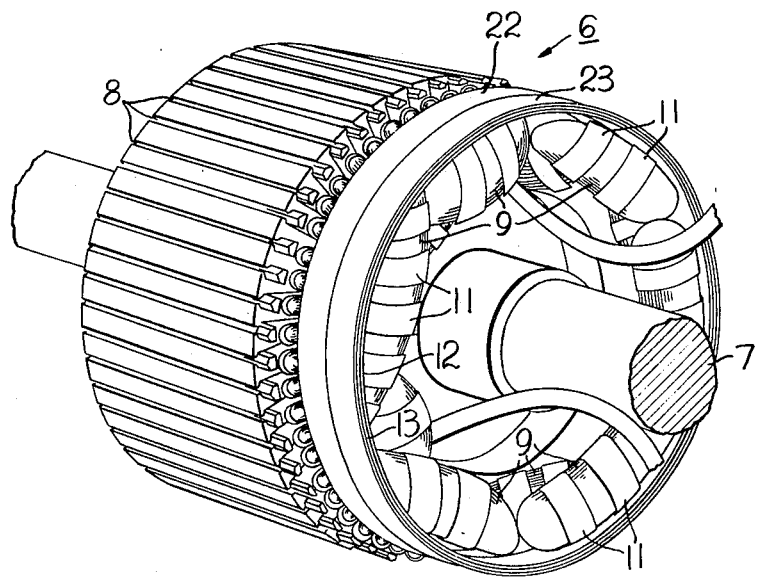
FIG. 1 is an isometric view of a dynamoelectric machine rotor having the end turns banded in accordance with the present invention.
Figure 2:
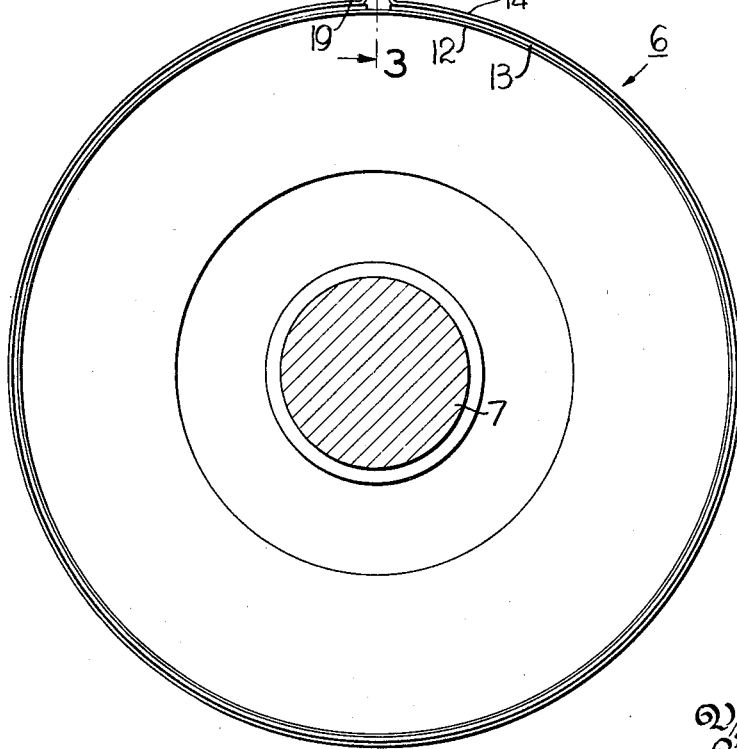
FIG. 2 is an enlarged partial end view showing the tightening strap applied to the open-ended ring.
Figure 3:
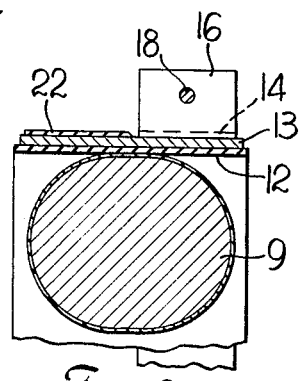
FIG. 3 is a partial cross sectional view taken along the lines 3—3 of FIG. 2.
Figure 4:
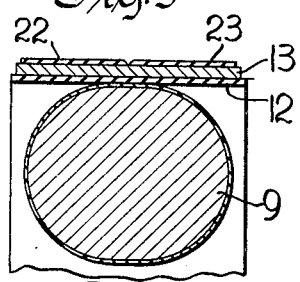
FIG. 4 is a partial cross sectional view showing a coil end turn after it has been banded.

Referring to the drawing and particularly FIG. 1, a rotor for a dynamoelectric machine is identified generally as item 6. As is conventional the rotor is provided with a shaft 7 and a plurality of circumferentially spaced winding slots 8 in the periphery of the rotor. Coil sides are positioned in each winding slot and extend beyond these slots at either end of the motor rotor. The ends of each coil at opposite ends of the motor are formed into turns and extend back through different coil slots.

The coil end turns 9 are shaped individually and compressed into a compact mass of bundles with any conventional lacing material such as for instance a cotton roving tape 11. It is preferable that no wire in an end turn bundle is unsupported for more than one and one-half inches. It is not critical whether or not the lacing is lapped or that the spaces between the lacings are even. The object of the lacing is to maintain all wires in close tight bundles.

A layer or any conventional electrical insulating material 12 such as for instance glass tape is provided about the peripheral surface of the end turns 9. An open-ended ring 13 is then loosely fitted over the insulation 12. It is preferred that this open-ended ring is of a width slightly less than the width of the insulation so as to insure electrical isolation of the ring from the end turn windings 9. The ring 13 may be composed of any high tensile strength nonmagnetic material such as nonmagnetic steel, or it may be nonmetallic in which case the insulation 12 would not be necessary. It should also be understood that the insulation 12 could be an integral part of the ring 13.

At this point, a tightening strap generally designated 14 is positioned about the ring 13. This tightening strap may be constructed in any conventional manner and is herein shown as being composed of a steel strap having the free ends thereof turned upward to provide upstanding ears 16 and 17. These ears have aligned bores 18 therethrough which may be internally threaded or may be provided with nuts 19. A threaded bolt 21 is turned through the nuts 19 to connect the free ends of the strap. It should be noted that preferably the width of the tightening srap 14 is approximately half the width of the open-ended ring 13. The tightening strap is preferably applied about the open-ended ring at its inner end close to the ends of the winding slots leaving the outer surface of the open-ended ring uncovered.

The bolt 21 is turned causing the tightening strap 14 to compress the open-ended ring 13 about the end turns 9. This tightening process continues until the bundles of end turns are compressed and held together in a tight mass.

When the end turn bundles are sufficiently compressed a plurality of layers of a heat curable tape 22 is wound about the exposed surface of the open-ended ring 13. This tape may be of the so-called "glass tape" type composed of long glass fibers held in a binder such as a polyester or epoxy resin. The tape has high tensile and dielectric strengths and is available in long lengths and various widths with a typical thickness of about 0.015 inch. As obtained from the manufacturer the binder is in a semi-cured condition, feels slightly tacky to the touch and adheres to itself sufficiently so that a tight band can be wound. The tape can be cured by a heat treatment typically by baking in an oven at a temperature of about 150 degrees centigrade for several hours. During the baking process the binder first flows and then solidifies into a permanently hard strong mass. The tape is wound about the uncovered surface of the open-ended ring 13 next to the strap 14 and parallel with it. The tape is built up to a sufficient thickness to withstand the centrifugal force on the end turns under all operating conditions taking into account the known tensile strength of the tape. After sufficient layers of the tape have been wound about the open-ended ring the tightening strap 14 is removed. An additional layer of tape 23 is then wound about the uncovered surface of the open-ended ring 13 previously occupied by the tightening strap 14. After sufficient layers of tape have been applied to this portion of the open-ended ring the tape is cured. This results in an extremely strong lightweight ring which holds the end turns 9 against centrifugal force.

From the above description, it can be seen that an inexpensive, easy to apply method of banding the end turns of a dynamoelectric machine rotor has been described. With this arrangement adequate instructions can be provided for the persons winding the end turns to insure a uniform end product.

Although only one embodiment of the subject invention has been herein shown and described, other embodiments will be apparent to those skilled in the art after reading this description and it is intended that all such embodiments as come within a reasonable interpretation of the appended claims be covered.

The embodiments of the invention in which an exclusive property or privilege is claimed are defined as follows:

1. The method of banding the end turns of a dynamoelectric machine rotor comprising the steps of: loosely applying an open-ended nonmagnetic electrically insulated high tensile strength ring about said end turns; applying a tightening strap about said open-ended ring so that a portion of the lateral peripheral surface of said ring is uncovered; tightening said strap until said ring has compressed said end turns; wrapping a plurality of layers of heat curable tape about the uncovered portion of said open-ended ring; removing said tightening strap; wrapping an additional plurality of layers of heat curable tape about the portion of said open-ended ring formerly occupied by said tightening strap; and applying heat to said tape layers to cure said tape.

2. The method of banding end turns of a dynamoelectric machine rotor comprising the steps of: lashing the end turns into a plurality of close tight bundles; applying a layer of insulating material about the peripheral surface of the end turns; applying a circular nonmagnetic open-ended steel ring over the insulation, the width of said steel ring being slightly less than the width of the insulation; applying a tightening strap about said steel ring, the width of said tightening strap being less than the width of said steel ring so that a portion of the lateral surface of the steel ring is left uncovered by said tightening strap; tightening said strap until the ends of said steel ring are substantially together and the end turn bundles are compressed into a substantial circle; wrapping a plurality of layers of heat curable glass tape about the uncovered portion of the steel ring; removing said tightening strap; applying another plurality of layers of heat curable glass tape about the surface of the steel ring formerly occupied by said tightening strap; and curing said heat curable tape.

References Cited

UNITED STATES PATENTS

| | | | |
|---|---|---|---|
| 2,959,699 | 11/1960 | Smith et al. | 310—270 X |
| 3,075,107 | 1/1963 | Eis et al. | 310—260 X |
| 3,320,452 | 5/1967 | Fortenbach et al. | 310—270 X |
| 3,365,600 | 1/1968 | Penn | 310—270 |

CHARLIE T. MOON, Primary Examiner

C. E. HALL, Assistant Examiner

U.S. Cl. X.R.

310—260, 270